(12) United States Patent
Zdenek et al.

(10) Patent No.: US 6,970,559 B2
(45) Date of Patent: Nov. 29, 2005

(54) METHOD AND APPARATUS FOR DETECTING ECHO CANCELLERS

(75) Inventors: Jerrold Scott Zdenek, Lagrange Park, IL (US); Marshall Lee Peltz, Lagrange Park, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 155 days.

(21) Appl. No.: 10/261,058

(22) Filed: Sep. 30, 2002

(65) Prior Publication Data

US 2004/0062385 A1 Apr. 1, 2004

(51) Int. Cl.[7] ................................. H04M 9/08

(52) U.S. Cl. .................. 379/406.01; 379/406.02; 379/406.05; 379/406.06

(58) Field of Search .............. 379/406.01, 406.04

(56) References Cited

U.S. PATENT DOCUMENTS

| | | | | |
|---|---|---|---|---|
| 3,637,954 A | * | 1/1972 | Anderson et al. | 379/406.01 |
| 4,881,221 A | * | 11/1989 | Schroeder et al. | 370/287 |
| 5,008,923 A | * | 4/1991 | Kitamura et al. | 379/406.01 |
| 5,815,568 A | | 9/1998 | Trump | |
| 6,011,783 A | * | 1/2000 | Interrante et al. | 379/406.01 |
| 6,212,374 B1 | * | 4/2001 | Scott et al. | 455/422.1 |
| 6,477,238 B1 | * | 11/2002 | Schneider et al. | 379/406.01 |
| 2002/0064139 A1 | * | 5/2002 | Bist et al. | 379/406.01 |
| 2004/0081107 A1 | * | 4/2004 | Christie | 370/286 |

* cited by examiner

*Primary Examiner*—Suhan Ni
*Assistant Examiner*—Ramnandan Singh
(74) *Attorney, Agent, or Firm*—Welsh & Katz, Ltd.

(57) ABSTRACT

A method is provided for detecting echo cancellation in a communication network. The method includes the steps of transmitting from an originating unit a pre-defined echo cancellation detection signal to a receiving unit. The resulting signal is detected by the receiving unit and analyzed to determine whether the differences between the resulting signal and a stored pre-defined signal indicate the detection of echo cancellation on the communication network.

24 Claims, 5 Drawing Sheets

METHOD AND APPARATUS FOR DETECTING ECHO CANCELLERS

BACKGROUND

The field of the invention relates, in general, to network echo cancellers used in telephony systems, and more particularly to a method of detecting active echo cancellation.

Echoes, in general, are signals returning to their original source by traveling in the opposite direction of the original signals. Echoes arise in telephony systems when part of its corresponding speech signal energy reflects back from the impedance mismatches in analog parts of a telephone network. Echo Cancellers are signal-processing devices that measure and then remove echoes in a telephone connection, by producing the exact opposite of a sampled speech pattern. Hence, the echo cancellers are used to clear up these echoes on voice channels between two points on the telephone network. The telephone networks are typically configured as a 4 to 2 wire conversion for a subscriber interfacing with a public switch telephone network. This wire conversion from the two-wire to the four-wire segment is typically performed via a device called a hybrid.

A typical long-distance telephone circuit can be described as being two-wire in the subscriber loop to the local hybrid, four-wire over the long portion of the network to the distant hybrid, and then two-wire to the distance telephone. Hence although the use of hybrids facilitates long distance voice transmission, impedance mismatches at the hybrids may result in echoes. The voice signal from one end of the network is reflected off the distant hybrid (the hybrid closest to the other end of the network) in the telephone network back toward the first end causing the echo.

Network echo cancellers are thus used in the land-based telephone network to eliminate echoes caused by impedance mismatches at the hybrids and are typically located in the central office along with the hybrid. The echo canceller located closest to one end of the network is thus used to cancel the echo caused by the hybrid at the other end of the network. It is however, generally recommended that the echo canceller should be switched off for connections carrying data traffic.

Known signal-processing methods have been developed for selectively removing or for substantially reducing echo signals. These methods produce a substantially accurate estimate of the echo signal that is then injected into the medium as a canceling mirror image of the echo signal. Inaccuracies due to such signal processing operations create signal residues, which end up corrupting the integrity of the original signal. Such distortions of the original signal are usually acceptable in voice communications. However if applied to a data line, the results are an inoperable link, as the data has been modified from its original form. This is especially a problem on lines that use voice on some channels and data on others. To prevent such data distortion, a need therefore arises to check if echo cancellers are operable on a line, or on an individual channel. Previous solutions were basically implemented by inquiring in person as to the presence of echo cancellers. Thus there is a need in the art to automate this detection of echo cancellers.

SUMMARY

In one embodiment, a method of detecting echo cancellation in a communication network includes transmitting a pre-defined signal to a receiving unit and detecting a resulting signal after transmission. The resulting signal is analyzed to determine whether the difference between the resulting signal and a stored pre-defined signal indicates the detection of echo cancellation on the communication network.

BRIEF DESCRIPTION OF DRAWINGS

The invention, together with the advantages thereof, may be understood by reference to the following description in conjunction with the accompanying figures, which illustrate some embodiments of the invention.

DETAILED DESCRIPTION

Figure 1:
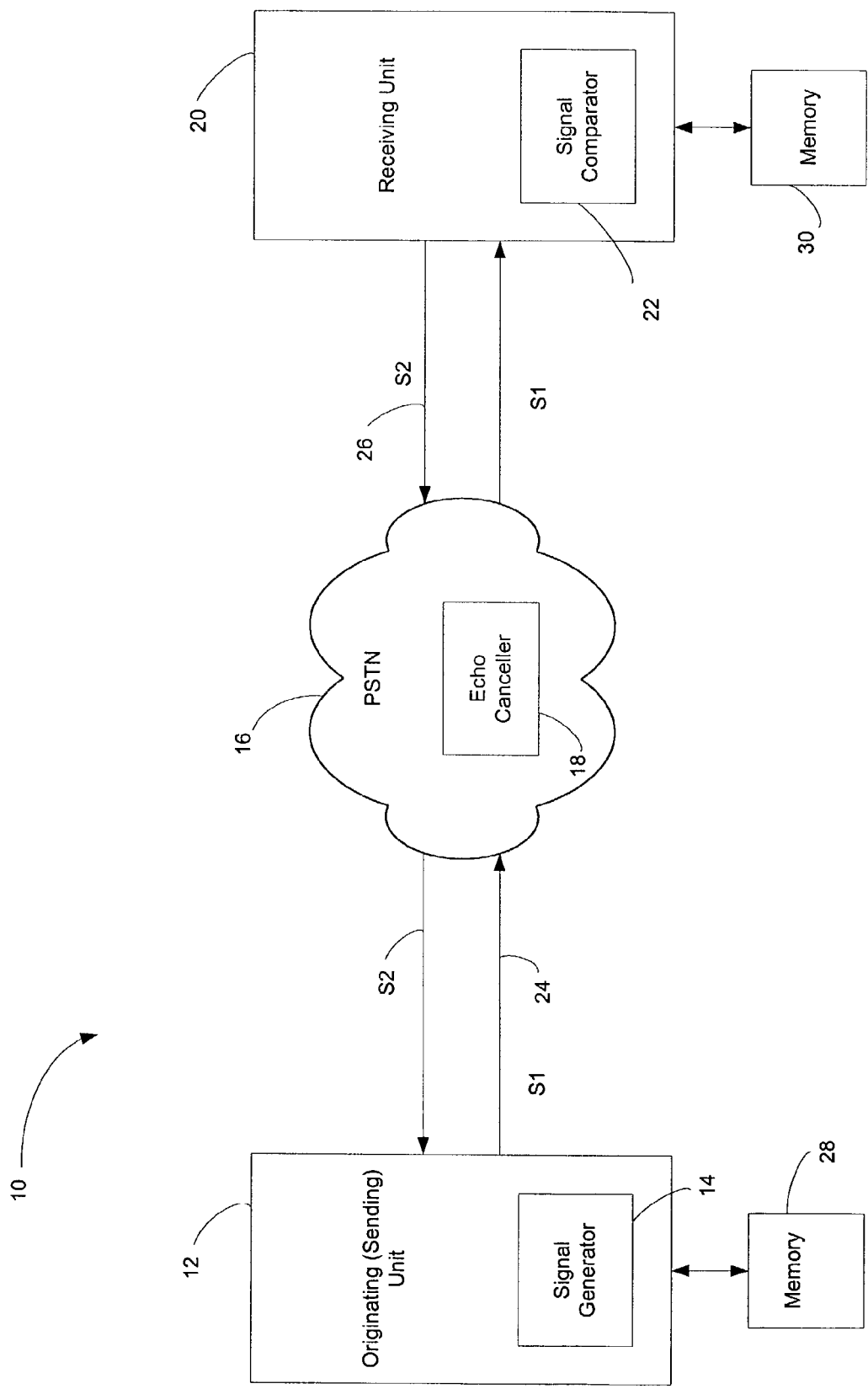
FIG. 1 is a functional block diagram illustrating an example communication network suitable for use of echo cancellers and detection of echo cancellation.

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

FIG. 1 is a functional block diagram illustrating an example communication network 10 illustrating use of an echo canceller 18 and detection of echo cancellation. In this example communication network 10, a sending (i.e. originating) unit 12 incorporates a signal generator 14 coupled with a memory 28. The sending unit 12 is coupled to a long distance connection 24 via a Public Switched Telephone network (PSTN) 16. The PSTN 16 may be any public carrier and may also include other communication networks. Depending on its own network complexity, the PSTN 16 may include one or more echo cancellers 18. In the example of FIG. 1, the echo cancellers 18 form part of the PSTN 16 to provide cancellation of echo signals for voice communication over the long distance connection. On the other side of the network, the PSTN 16 is coupled to a receiving unit 20 via a local communication connection 26. The receiving unit 20 incorporates a signal comparator 22, used for comparing an incoming received signal with a predefined signal stored in a memory 30. Those skilled in the art will appreciate that other network configurations are possible for the implementation of the method of detecting echo cancellation.

Figure 2:
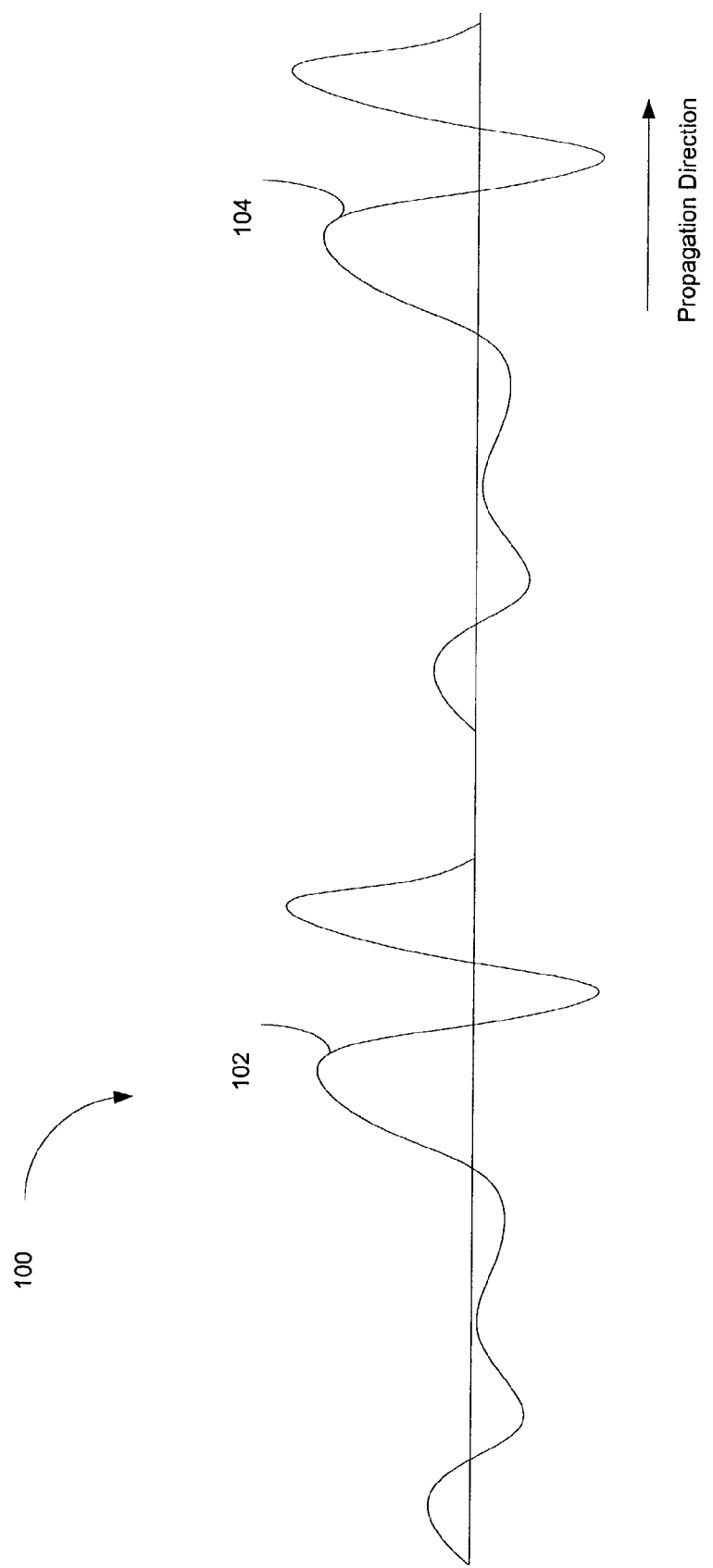
FIG. 2 is a diagram illustrating examples of generated and received communication signals that may be utilized in an embodiment of the method of detecting echo cancellation.

FIG. 2 is a diagram 100 illustrating examples of generated and received communication signals 102 and 104 that may be used to provide a further understanding of the method of detecting echo cancellers. Referring to FIG. 1, the signal generator 14 initiates a predefined echo cancellation detection signal such as the example signal 102 so shaped that it appears to contain echo or has a shape which will be modified by an echo canceller in such a way as to indicate it has been subjected to echo cancellation. This predefined signal 102 is transmitted from this sending unit 12 to the receiving unit 20 via the PSTN 16. If the resulting signal 104, after transmission, almost matches the image of the predefined stored signal which may include an echo part, then this substantial match indicates that echo cancellation is not enabled on this communication path. However if the resulting signal 104 does not match the image of the predefined stored signal, the signal comparator 22 can verify that the difference between these two signals is actually due to echo cancellation, rather than to conventional device leaks and attenuations and/or to noise introduced by the network. Even in the presence of active echo cancellation, measurable signal residues may be present in the received signal, and the signal comparator can be programmed to recognize such discrepancies. The above method may be performed by suitable circuitry, software, a computer, an application server, or some other processor using instructions that may reside on a computer-readable medium. The computer-readable medium may be any suitable computer readable storage medium such as, but not limited to random access memory, read-only memory, flash memory, CDROM, DVD, solid-state memory, magnetic memory, optical memory, etc.

Figure 3:
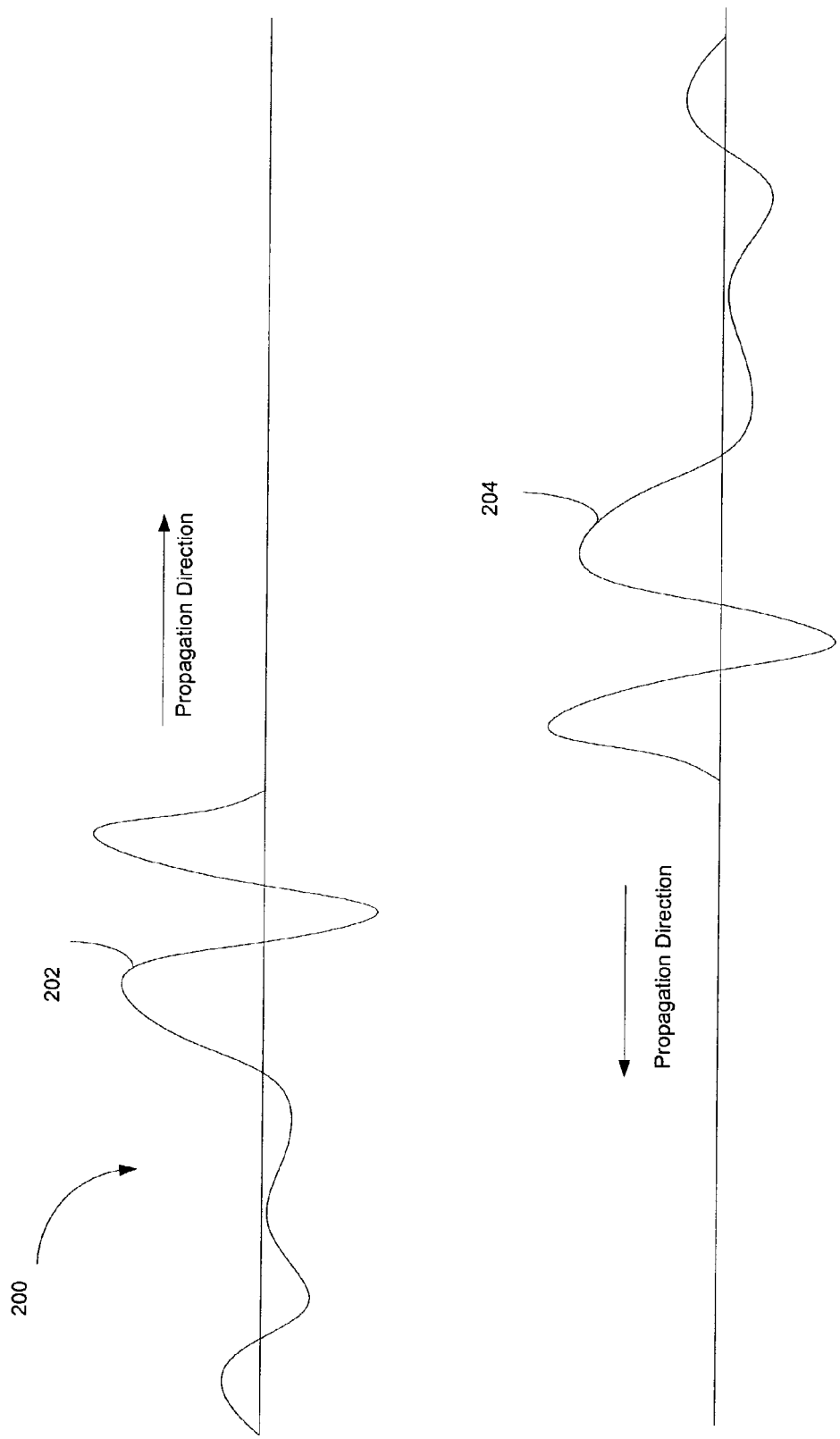
FIG. 3 is a diagram illustrating signals in an example wherein an original predefined signal, after being received by a receiving unit, is retransmitted back to the sending unit.
Figure 5:
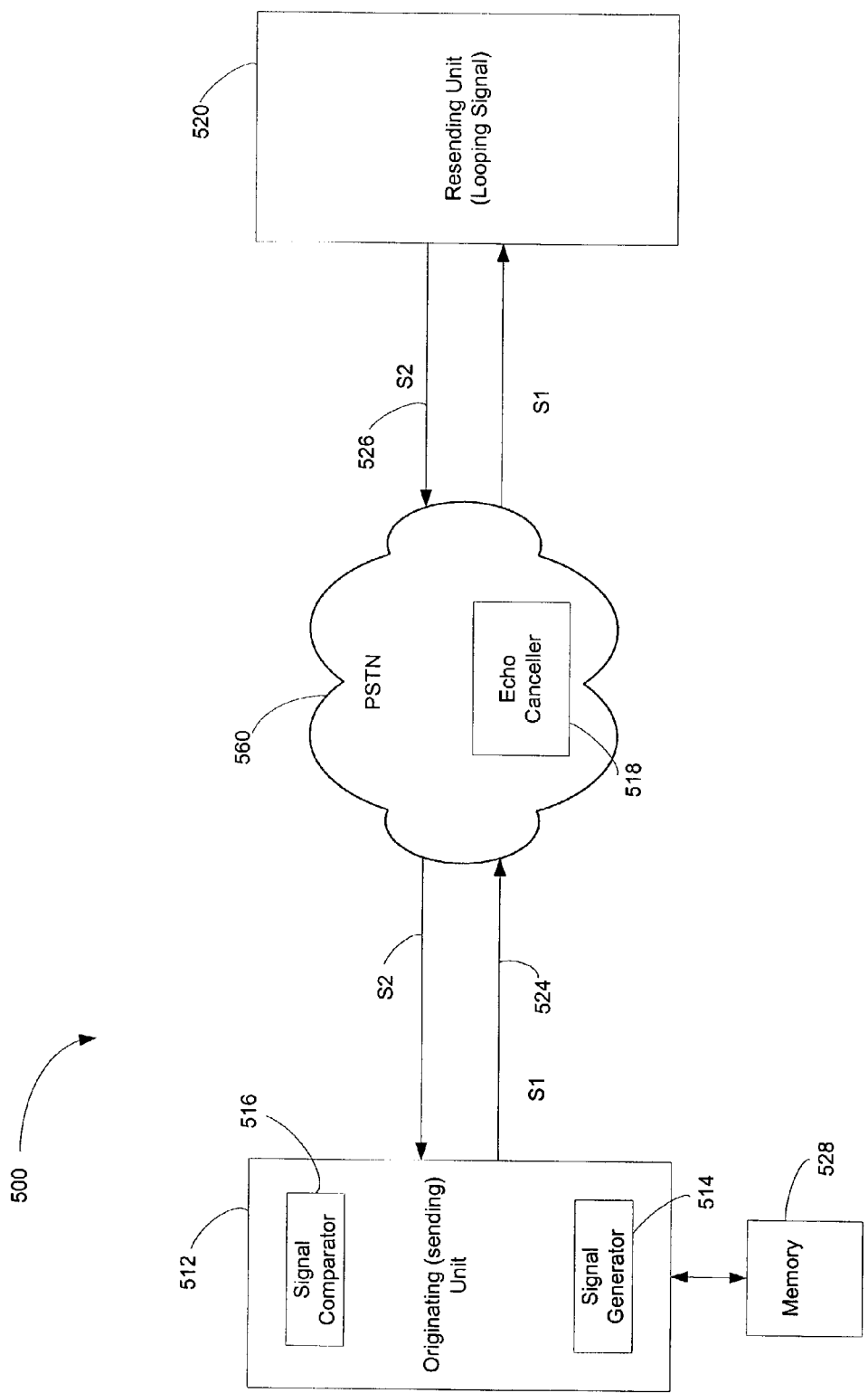
FIG. 5 is a functional block diagram illustrating an example communication network suitable for use of echo cancellers and detection of echo cancellation, wherein an original predefined signal is looped back to an originating unit.

FIG. 3 is a diagram illustrating signals in another embodiment, wherein the original predefined signal is made to loop back to the sending unit. One example of such embodiment is illustrated in FIG. 5. In this embodiment, the sending device 512 of FIG. 5 may be utilized to check for echo cancellation if the pre-defined signal 202 is made to loop-back once it reaches the other end of the path. This loop-back scheme allows the pre-defined signal 202 to be stored, for comparison purposes against the detected looped-back signal 204, by just one device at the sending end only. Therefore reducing the need to store the predefined signal in more than one location. The predefined signal 202, generated by the sending unit 512, received and sent back by the re-sending unit 520, would be checked for echoes by active echo cancellers in both directions.

Figure 4:
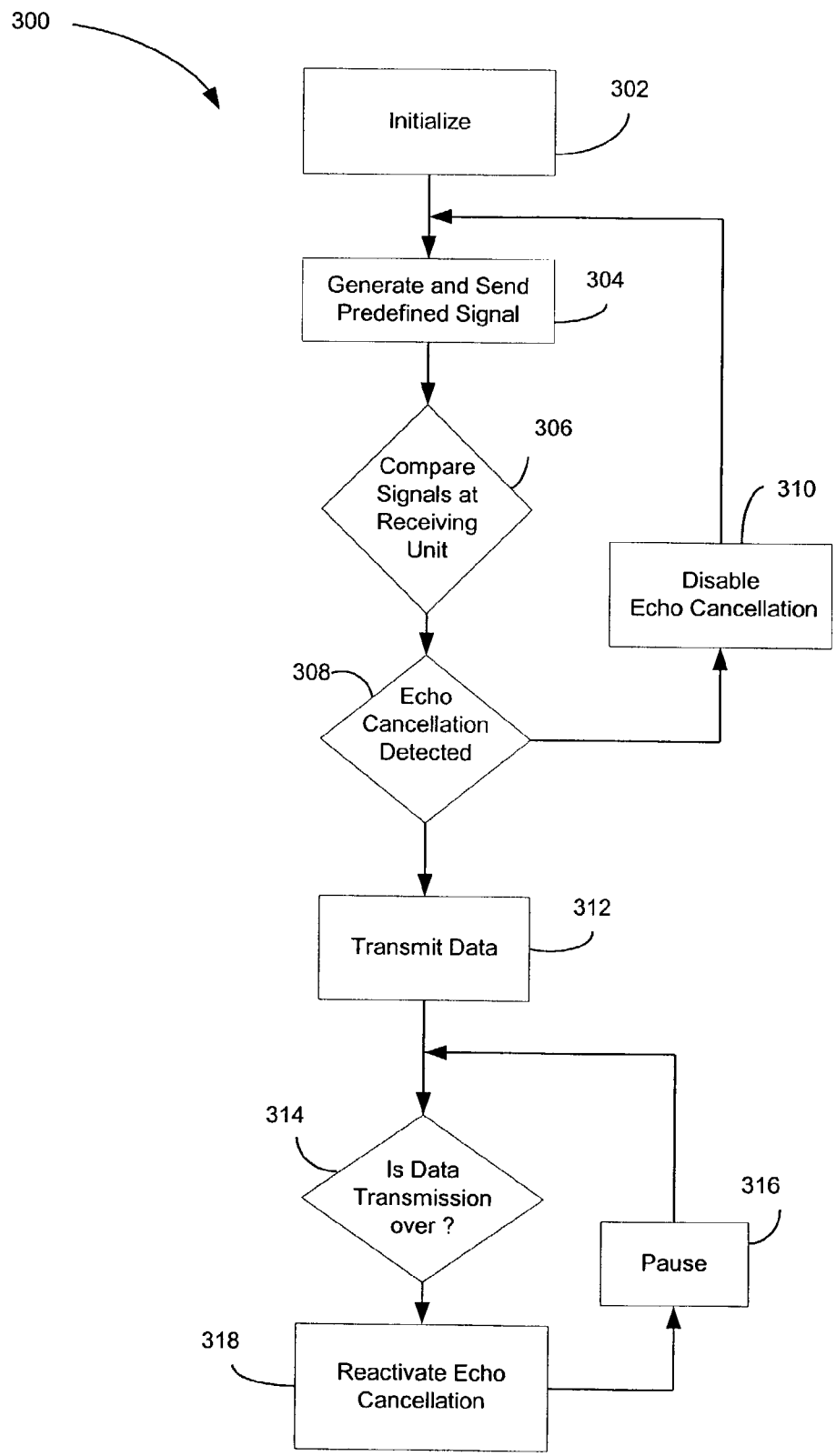
FIG. 4 is a flow chart illustrating one embodiment of a method of detecting echo cancellation during a process of establishing a data communication link on a communication line.

FIG. 4 is a flow chart illustrating one embodiment of a process of establishing a data link on a communication network with detection of echo cancellation. After initialization at step 302, generation and transmission of a pre-defined echo cancellation detection signal is performed as illustrated at step 304. Once received by the receiving unit 520, the signal is analyzed by the signal comparator 22 at step 306 for any changes due primarily to the presence of active echo detectors on the communication network or made to loop back to for similar analysis by the sending unit 512. If the presence of echo cancellation is detected, well-known measures in the art of echo canceller disablement are utilized to disable the detected echo canceller(s) as illustrated at steps 308 and 310. These well-known measures in modern echo cancellation include, but are not limited to, the standard defined by the ITU-T, International Telecommunications Union-Telecommunications, Standard G.168. The ITU-T standard has defined a 2100 Hz periodically phase-reversed tone signal to disable echo-cancellers. Although a typical voice band ranges from 300 Hz to 3400 Hz, a periodic phase-reversal at 2100 Hz is not expected. Typically a PSTN should disable (i.e. turn-off) echo cancellers during certain in-band signaling sequences, when carrying medium-speed and high-speed modem calls, and for configurations where several network sections are equipped with echo cancellation (i.e. tandem echo canceller arrangements). Typically, an in-band 2100 Hz tone is generated by a switching system or voice-band modem to disable echo cancellers. This technique is commonly called "straight tone disable". Echo cancellation equipment using this standard are capable of detecting a 2100 Hz tone and subsequently disabling the echo cancellation function for the respective channel(s) carrying the tone. Similarly, when the call that required disabled echo cancellation is completed or if the 2100 Hz signal energy level drops below a preset threshold for a specific time interval, the echo cancellation function should be automatically re-enabled (i.e. the echo canceller(s) is/are "turned back on" when the 2100 Hz tone is absent).

Once the disablement of the detected echo cancellation is confirmed at step 308, the transmission of data commences at step 312. Once the transmission of data is completed, the echo cancellers are reactivated at step 318.

FIG. 5 is a functional block diagram illustrating an example communication network 500 illustrating use of an echo canceller 518 and detection of echo cancellation. In this example, a sending unit 512 incorporates a signal generator 514 and a signal comparator 516 coupled with a memory 528 to store the predefined echo cancellation detection signal. The sending unit 512 is coupled to a long distance connection 524 via a Public Switched Telephone network (PSTN) 560. On the other side of the network, the PSTN 560 is coupled to a resending unit 520 via a local communication connection 526, which resends the resulting signal. Those skilled in the art will appreciate that other network configurations are possible for the implementation of the method of detecting echo cancellation.

In another embodiment, a plurality of routes can be tested, for example, by the signal comparator 516, to detect the existence of echo cancellation and to detect the route most suitable for the transmission of data. Thus, for example, the best route detected without echo cancellation could then be selected for the transmission. In another example, after detecting echo cancellation, the system may test other routes to locate alternative route without echo cancellation.

In another embodiment, the method of detecting echo cancellation can also facilitate the detection of mis-configured or malfunctioning equipment by comparing predefined signals generated by one communication unit against resulting signals received by other units on the same network.

Specific embodiments of novel methods and apparatus for detecting echo cancellation have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover any and all modifications, variations, or equivalents that fall within the true spirit and scope of the basic underlying principles disclosed and claimed herein.

What is claimed is:

1. A method for establishing a data link in a communication network, the method comprising:
transmitting from an originating unit disposed within a subscriber loop a pre-defined echo cancellation detection signal to a receiving unit that is also disposed within a subscriber loop;

detecting a resulting signal after transmission;
comparing the resulting signal with the pre-defined echo cancellation detection signal;
when the resulting signal substantially matches the pre-defined echo cancellation detection signal determining that echo cancellation is not enabled; and
establishing the data link when echo cancellation has been determined to not be enabled.

2. The method of claim 1 wherein disablement of echo within the resulting signal reveals detection of echo cancellation.

3. The method of claim 1 wherein the echo cancellation detection signal is shaped to appear to contain an echo.

4. The method of claim 1 further comprising determining that the difference between the resulting signal and the stored signal is due to echo cancellation rather than to conventional unit leaks and attenuations and/or to noise introduced by the network.

5. The method of claim 1 further comprising:
looping the transmitted resulting signal back to the originating performing the analyzing step on the resulting signal which was looped back.

6. The method of claim 1 further comprising:
detecting the resulting signal at a receiving unit at a location separate from that of the originating unit, and storing the stored predefined signal at the location of the receiving unit; and
analyzing the resulting signal at the location of the receiving unit.

7. The method of claim 1 further comprising:
disabling echo cancellation;
transmitting data until completion; and
reactivating echo cancellation upon completion of the data transmission.

8. The method of claim 1 further comprising locating an alternate communication route in response to detection of echo cancellation in a selected communication route.

9. The method of claim 1 further comprising testing other routes through the communication network to locate an alternate route without echo canceling.

10. A system for establishing a data link in a communication network, the method comprising:
means for transmitting from an originating unit disposed within a subscriber loop a pre-defined echo cancellation detection signal to a receiving unit that is also disposed within a subscriber loop;
means for detecting a resulting signal after transmission;
means for comparing the resulting signal with the pre-defined echo cancellation signal;
when the resulting signal has not been modified, determining that echo cancellation is not enabled; and
establishing the data link when echo cancellation is not enabled.

11. The system for detecting echo cancellation in a communication network, as in claim 10 further comprising means for looping the resulting signal back to the originating device; and wherein the means for analyzing is located in proximity to the originating device for analyzing the resulting signal that was looped back.

12. The system for detecting echo cancellation in a communication network, as in claim 10 further comprising:
means for disabling echo cancellation;
means for transmitting data until completion; and
means for reactivating echo cancellation upon completion of the data transmission.

13. The system for detecting echo cancellation in a communication network, as in claim 10 further comprising means for locating an alternate communication route in response to detection of echo cancellation in a selected communication route.

14. The system of claim 10 further comprising means for testing other routes through the communication network to locate an alternate route without echo canceling.

15. A computer-readable medium having encoded therein computer-executable instructions for performing a method for establishing a data link in a communication network, the method comprising:
transmitting from an originating device disposed within a subscriber loop a pre-defined echo cancellation detection signal to a receiving device that is also disposed within a subscriber loop;
detecting a resulting incoming signal after transmission;
comparing the resulting signal with the pre-defined echo cancellation signal;
when the resulting signal has not been modified, determining that echo cancellation is not enabled; and
establishing the data link when echo cancellation is not enabled.

16. The computer-readable medium as in claim 15 wherein the method comprises:
looping the transmitted incoming signal back to the originating device; and
performing the analyzing step on the resulting signal which was looped back.

17. The computer-readable medium as in claim 15 wherein the method comprises:
detecting the resulting signal at a receiving unit at a different location, and storing the stored predefined signal at the location of the receiving unit; and
analyzing the resulting signal at the location of the receiving unit.

18. The computer-readable medium as in claim 15 wherein the method comprises:
disabling the echo cancellation;
transmitting data until completion; and
reactivating echo cancellation upon completion of the data transmission.

19. The computer-readable medium as in claim 15 wherein the method comprises locating an alternate communication route in response to detection of echo cancellation in a selected communication route.

20. The computer readable medium of claim 15 further comprising testing other routes through the communication network to locate an alternate route without echo canceling.

21. A system for performing the method for establishing a data link in a communication network, the system comprising:
a transmitter disposed within a subscriber loop that is programmed to transmit a pre-defined echo cancellation detection signal from an originating unit to a receiving unit that is also disposed within a subscriber loop;
signal comparator adapted to compare the resulting signal with the pre-defined echo cancellation signal;
when the resulting signal has not been modified, determining that echo cancellation is not enabled;
memory in which the predefined signal is stored for comparison with the resulting signal; and
a signal generator for establishing the data link.

22. The system for performing the method for detecting echo cancellation in a communication network as in claim 21 further comprising:
retransmission circuit to loop the resulting signal after transmission back to the originating unit, and wherein the signal comparator performs the analyzing step on the signal which was looped back.

23. The system for performing the method for detecting echo cancellation in a communication network as in claim 21 further comprising:

retransmission circuit to detect and retransmit the resulting signal at a receiving unit at a location separate from the originating unit and wherein the memory stores the stored predefined signal at the location of the receiving unit to analyze the resulting signal at the location of the receiving unit.

24. The system for performing the method for detecting echo cancellation in a communication network, as in claim 21 further comprising:

at least one processor to disable echo cancellation, to transmit data until completion, to reactivate echo cancellation upon completion of the data transmission; and memory in which the predefined signal is stored for comparison with the resulting signal.

* * * * *